Patented Dec. 13, 1938

2,139,773

UNITED STATES PATENT OFFICE 2,139,773

PRODUCTION OF VALUABLE PRODUCTS FROM PETROLEUM HYDROCARBONS

Raphael Rosen, Cranford, and Charles A. Cohen, Elizabeth, N. J., assignors to Standard Oil Development Company, a corporation of Delaware No Drawing. Application March 30, 1934, Serial No. 718,200

4 Claims. (Cl. 260—170)

This invention relates to improvements in the manufacture and production of valuable products from petroleum hydrocarbons and relates particularly to a process of treating with solvents distillates obtained from the products formed by cracking petroleum hydrocarbons.

The petroleum distillates obtained from the products formed by vapor phase cracking of petroleum hydrocarbons contain saturated and unsaturated compounds together with hydrogen. Two series of unsaturated compounds are found present in substantial quantities, i. e., olefines and diolefines. The diolefines readily polymerize and form gums and therefore are generally removed before the distillates are marketed. The percentage of diolefines present varies from about 1% in products formed by liquid phase cracking to about 10% in products formed by vapor phase cracking.

According to the present invention, the diolefines and a fraction of the olefines are removed from the petroleum distillates by the use of solvents, recovered and used in the preparation of valuable products by polymerizing with the aid of a metallic halide or other catalysts to produce synthetic resins, oils, thickeners, lubricants, drying oils, and the like.

An object of this invention is to provide a process for solvent treating the petroleum distillates formed by cracking petroleum hydrocarbons so that more valuable products are prepared both from the extracted material and the extract.

This and other objects of the invention will be readily understood by the following illustration:

The following organic solvents, alkyl esters of citric acid such as triethyl citrate, methyl alcohol, and dimethyl phthalate, are found suitable for extracting a mixture of olefines and diolefines from cracked petroleum distillates. These organic solvents are used to separate the olefines and diolefines, for example, by contacting with a cracked petroleum distillate. This is done by shaking one of the above solvents or a mixture of the solvents with the cracked petroleum distillate, or otherwise bringing the solvents and distillate into intimate contact, allowing the resulting mixture to settle and stratify and withdrawing the solvent layer. The olefines and diolefines dissolved in the solvent are then separated from the solvent by heating, dilution or the like. When gaseous mixtures containing unsaturated compounds are to be treated, the olefines and diolefines may be dissolved in the solvents by bubbling the gaseous mixture through one or more bodies of the organic solvents. The olefines and diolefines are then expelled from the organic solvents by the application of heat and segregated. The contacting of the organic solvents and the cracked petroleum distillates may be made at temperatures from $-30°$ to $100°$ C., preferably room temperature, though lower temperatures are desirable when treating gaseous mixtures. Atmospheric pressures may be used, though higher pressures are desirable when gaseous olefines and diolefines are being recovered to maintain the extract in the liquid phase. A countercurrent method of treating may also be used such as by passing the product into an intermediate part of an absorber, passing the solvent into the upper portion of the absorber and a volatile saturated hydrocarbon such as propane, butane, hexane, etc. into the lower part of the absorber. The solvent, on coming in contact with the petroleum distillate, mechanically holds in suspension a fraction of saturated hydrocarbons. It is desirable to remove these saturated hydrocarbons from the solvent and this is done by passing an inert gas such as a volatile saturated hydrocarbon, e. g. propane, through the solvent. The method of extraction may be either batch or continuous.

The separated mixtures of olefines and diolefines that are preferably extracted by these solvents in a diolefine-olefine ratio greater than one, may then be contacted with a catalyst such as anhydrous aluminum chloride or boron fluoride. Suitable cooling means are provided as the reaction is a rapid one with the evolution of heat. The reaction is controlled by adding the catalyst slowly to the mixture of olefines and diolefines. A resin is formed whose carbon-hydrogen ratio varies with the amount of olefine present. The amount of olefine present governs the hardness of the resin formed as where more olefines are present a softer resin is produced. Other catalysts such as sulfuric acid, phosphates, etc., at higher temperatures may also be used. The diolefines present in the extracted mixture may be further separated from the olefines by means of substances such as maleic anhydride or cuprous chloride with ammonium chloride, and used in the preparation of resins. The concentrate may be used as a source of high concentration of diolefines to be used for rubber production, or any reactions which may be developed for diolefine.

The following table illustrates the various proportions of olefines and diolefines that are removed by the use of various solvents:

| Solvent | Volume to volume extraction of 1% of solution of pentene and 1% solution of isoprene in a gasoline solution | |
|---|---|---|
| | Percent of pentene removed | Percent of isoprene removed |
| Triethylcitrate | 23.0 | 34.0 |
| Dimethyl phthalate | 25.0 | 35.0 |

Mixtures of the above solvents may also be used to obtain a mixture of olefines and diolefines of the desired proportions.

The foregoing description is merely illustrative and alternative arrangement may be made within the scope of the appended claims in which it is our intention to claim all novelty as broadly as the prior art permits.

We claim:

1. A process for the separation of olefines and diolefines from other substances which comprises contacting at temperatures from minus 30° C. to 100° C. a mixture of olefines and diolefines and other hydrocarbons with dimethyl phthalate, separating the solvent, and recovering olefines and diolefines from the separated solvent.

2. A process for the separation of olefines and diolefines from other substances which comprises contacting at temperatures from minus 30° C. to 100° C. a mixture of olefines and diolefines and other hydrocarbons with dimethyl phthalate, separating the solvent, treating the olefines and diolefines in the separated solvent with a condensing agent to form resins, and recovering the resins.

3. A process of separating and recovering constituents of petroleum products which comprises intimately contacting a petroleum product in liquid form with dimethyl phthalate, under circumstances permitting development of a two-phase liquid and separating the two phases by gravity.

4. A process according to claim 3 in which the petroleum product is a cracked stock.

RAPHAEL ROSEN.
CHARLES A. COHEN.